US010068039B1

(12) United States Patent
Vennam et al.

(10) Patent No.: US 10,068,039 B1
(45) Date of Patent: Sep. 4, 2018

(54) SYSTEMS AND METHODS FOR SIMULATING A CIRCUIT USING A HYBRID FINITE ELEMENT—CIRCUIT ANALYSIS OPERATION

(71) Applicant: Ansys, Inc., Canonsburg, PA (US)

(72) Inventors: Prakash Vennam, Cupertino, CA (US); Matthew Stephanson, Santa Clara, CA (US)

(73) Assignee: Ansys, Inc., Canonsburg, PA (US)

( * ) Notice: Subject to any disclaimer, the term of this patent is extended or adjusted under 35 U.S.C. 154(b) by 55 days.

(21) Appl. No.: 15/178,584

(22) Filed: Jun. 10, 2016

Related U.S. Application Data

(60) Provisional application No. 62/175,792, filed on Jun. 15, 2015.

(51) Int. Cl.
*G06F 17/50* (2006.01)
*H05K 1/02* (2006.01)
*H05K 1/11* (2006.01)

(52) U.S. Cl.
CPC ....... *G06F 17/5018* (2013.01); *H05K 1/0237* (2013.01); *H05K 1/11* (2013.01); *H05K 1/115* (2013.01); *G06F 17/5045* (2013.01); *G06F 17/5072* (2013.01); *H05K 2201/1075* (2013.01)

(58) Field of Classification Search
CPC ............ G06F 17/5009; G06F 17/5004; G06F 17/5045; G06F 17/5072; G06F 17/5081; G06F 17/5018; H05K 1/11; H05K 1/0237; H05K 1/115; H05K 2201/1075
See application file for complete search history.

(56) References Cited

U.S. PATENT DOCUMENTS

| 6,353,801 B1* | 3/2002 | Sercu ............... G01R 31/2848 702/173 |
| 7,509,247 B2* | 3/2009 | Jiao .................. G06F 17/5018 703/14 |
| 7,990,158 B2* | 8/2011 | Ludwig ............ G01R 31/2837 324/637 |

(Continued)

OTHER PUBLICATIONS

Greda et al.; "Hybrid analysis of three-dimensional structures by the method of lines using novel nonequidistant discretization"; Year: 2002; 2002 IEEE MTT-S International Microwave Symposium Digest (Cat. No. 02CH37278); vol. 3; pp. 1877-1880 vol. 3; Cited by: Papers (6).*

Primary Examiner — Helen Rossoshek
(74) Attorney, Agent, or Firm — Jones Day

(57) ABSTRACT

Systems and methods are provided for performing a simulation of an integrated circuit, integrated circuit package, or printed circuit board design. A representation of the design is accessed that includes a plurality of components inside a volume. The volume is discretized into a plurality of volumetric elements. A removable signal transmission element is identified in the volume. The signal transmission element is removed from the volume. An electrical parameter associated with the removed signal transmission element is identified. A finite element method operation is performed to identify a characteristic of the design based on the discretized volume having the signal transmission element removed and the electrical parameter, an electrical impact of the signal transmission element on the package being retained based on the electrical parameter.

22 Claims, 16 Drawing Sheets

(56) References Cited

U.S. PATENT DOCUMENTS

| | | | | |
|---|---|---|---|---|
| 8,250,506 B2* | 8/2012 | Bantas | ............... | G06F 17/5036 716/110 |
| 8,510,091 B1* | 8/2013 | Zhao | ................. | G06F 17/5018 343/767 |
| 8,924,186 B1* | 12/2014 | Zhao | ................. | G06F 17/5095 703/13 |
| 8,938,372 B1* | 1/2015 | Petersson | ................. | H04B 3/00 703/2 |
| 9,063,882 B1* | 6/2015 | Zhao | ..................... | G06F 17/12 |
| 9,135,379 B2* | 9/2015 | Williams | ............ | G06F 17/5009 |
| 9,672,319 B1* | 6/2017 | Cao | .................... | G06F 17/5081 |
| 9,715,567 B1* | 7/2017 | Xu | ..................... | G06F 17/5072 |
| 9,715,569 B1* | 7/2017 | Liu | .................... | G06F 17/5081 |
| 2002/0097108 A1* | 7/2002 | Jain | ....................... | H01P 3/121 333/26 |
| 2005/0246669 A1* | 11/2005 | Yamazaki | .......... | G06F 17/5018 716/115 |
| 2008/0221850 A1* | 9/2008 | Bennett | .............. | G06F 17/5018 703/14 |
| 2009/0177456 A1* | 7/2009 | Jandhyala | .......... | G06F 17/5018 703/14 |
| 2009/0234602 A1* | 9/2009 | Kashiwakura | ...... | G06F 17/5036 702/65 |
| 2011/0251832 A1* | 10/2011 | Schoeberl | .......... | G06F 17/5018 703/2 |
| 2012/0221988 A1* | 8/2012 | Dai | .................... | G06F 17/5045 716/111 |
| 2013/0321093 A1* | 12/2013 | Ueda | ....................... | H01P 1/32 333/17.3 |

* cited by examiner

FIG. 2   E.G., S-PARAMETERS

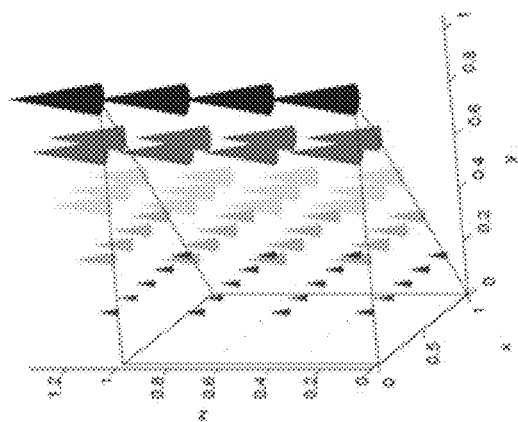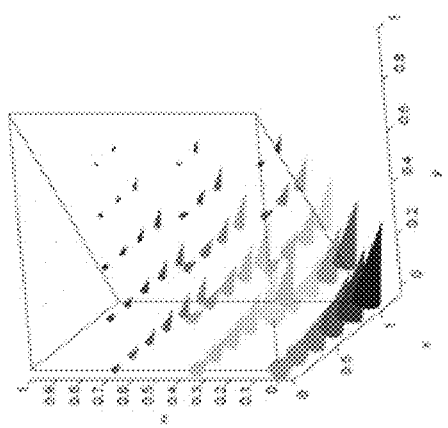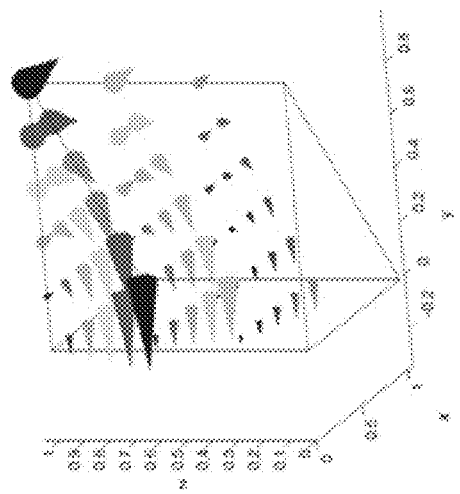
FIG. 3

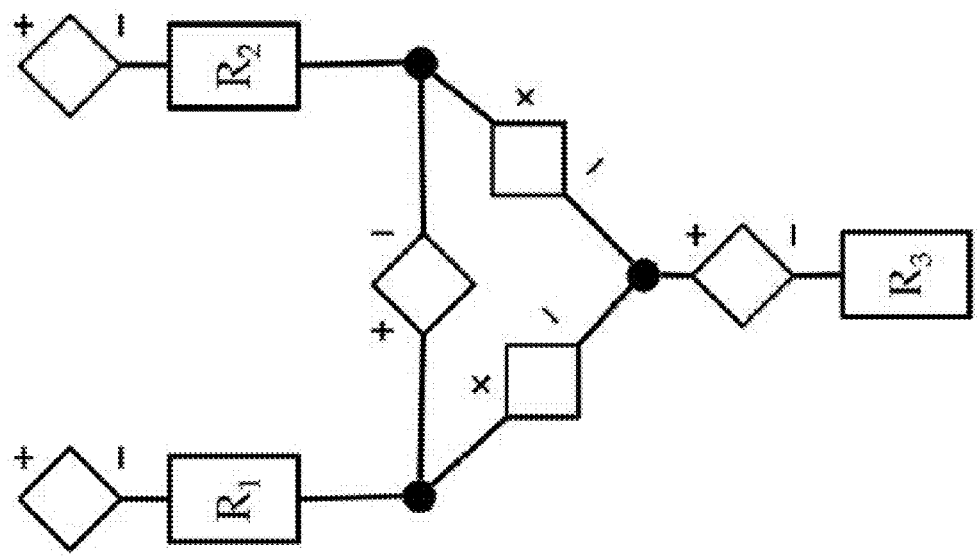
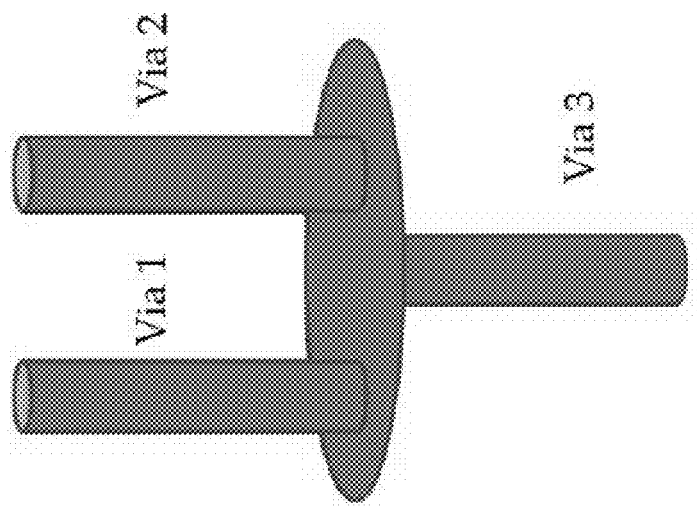
FIG. 14

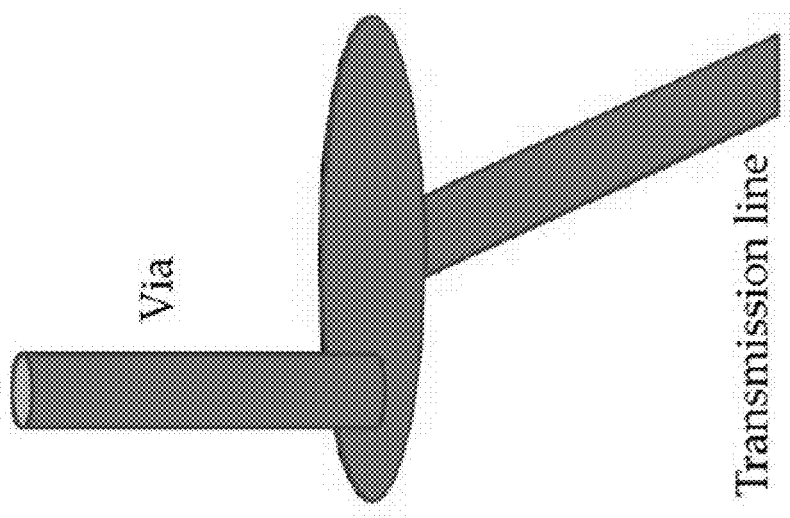
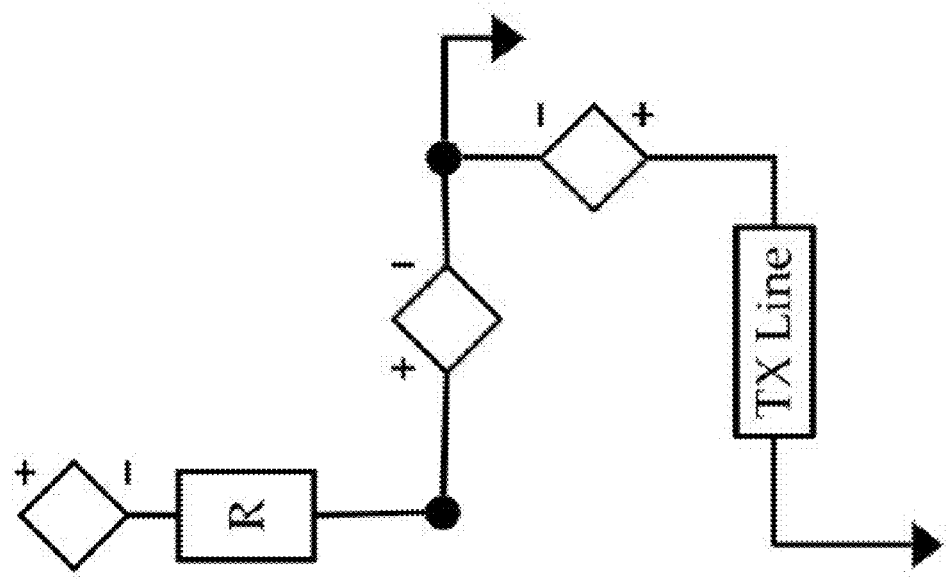
FIG. 15

SYSTEMS AND METHODS FOR SIMULATING A CIRCUIT USING A HYBRID FINITE ELEMENT—CIRCUIT ANALYSIS OPERATION

CROSS-REFERENCE TO RELATED APPLICATIONS

This application claims priority to U.S. Provisional Patent Application No. 62/175,792, filed Jun. 15, 2015, entitled "Systems and Methods for Simulating a Circuit Using a Hybrid Finite Element Circuit Analysis Operation," which is incorporated herein by reference in its entirety.

FIELD

This disclosure is related generally to physical system simulation and more particularly to simulation of an integrated circuit, integrated circuit package, or printed circuit board design.

BACKGROUND

High-speed integrated circuit, integrated circuit package, and printed circuit board design benefits from accurate power and signal integrity (PI/SI) analysis (e.g., to identify parasitics, S-parameters). Fast analysis turnaround time enables designers to study what-if scenarios throughout the design cycle, which can help in meeting tightly-managed product schedules. Modern high speed and low power designs are taxing on full wave electromagnetic solvers. Broadband analysis involves extraction of S-parameters over a multi-GHz range, often requiring long computation times to determine a solution (e.g., hours, days, or longer).

SUMMARY

Systems and methods are provided for performing a simulation of an integrated circuit, integrated circuit package, or printed circuit board design. A representation of the design is accessed that includes a plurality of components inside a volume. The volume is discretized into a plurality of volumetric elements. A removable signal transmission element is identified in the volume. The signal transmission element is removed from the volume. An electrical parameter associated with the removed signal transmission element is identified. A finite element method operation is performed to identify a characteristic of the design based on the discretized volume having the signal transmission element removed and the electrical parameter, an electrical impact of the signal transmission element on the package being retained based on the electrical parameter.

As another example, a system is provided for performing a simulation of an integrated circuit, integrated circuit package, or printed circuit board design. The system includes a processing system that includes one or more data processors. A computer-readable medium is encoded with instructions for commanding the processing to execute a method. In the method, a representation of the design is accessed that includes a plurality of components inside a volume. The volume is discretized into a plurality of volumetric elements. A removable signal transmission element is identified in the volume. The signal transmission element is removed from the volume. An electrical parameter associated with the removed signal transmission element is identified. A finite element method operation is performed to identify a characteristic of the design based on the discretized volume having the signal transmission element removed and the electrical parameter, an electrical impact of the signal transmission element on the package being retained based on the electrical parameter.

BRIEF DESCRIPTION OF THE DRAWINGS

FIG. 3 is a diagram depicting prism basis functions.

FIG. 14 depicts a circuit for three hybrid vias connected to remove a pad.

FIG. 15 is a diagram depicting a circuit for a removable pad with hybrid transmission line connections.

DETAILED DESCRIPTION

Existing solvers are broadly classified into 3 dimensional full-wave solvers and 2.5 dimensional hybrid solvers. The 3 dimensional full-wave solvers use numerical techniques such as the finite element method (FEM) or method of moments (MoM). In 3 dimensional implementations, all geometric objects, such as planes, transmission lines, vias, and pads, are meshed with 3 dimensional volumetric or surface mesh elements. 3 dimensional solvers provide high accuracy for both power integrity and signal integrity applications. A drawback is that runtime of such 3 dimensional solvers often stretches into hours or days for complex layouts. Much of this computation time is caused by meshing and refining signal transmission objects such as vias, pads, and transmission lines.

Faster processing can be realized using 2.5 dimensional hybrid tools. Such tools use parallel plate mode approximations, combined with modal decompositions for signals. Parasitics of individual geometric objects, such as vias and pads are modeled using empirical formulas or by solving localized 3 dimensional problems. 2.5 dimensional hybrid solvers tend to be fast. But they often have difficulty handling structures with non-ideal grounds, cutouts, solder balls, and bumps that are outside field domains and further tend to fail to provide accurate results over multi-GHz bandwidths.

Systems and methods as described herein perform certain modifications to a circuit representation, such as removing certain signal transmission elements from the design. Those modifications result in a simplified design. A circuit analysis is performed to identify an electric parameter associated with the removed signal transmission elements. The electric parameter is incorporated into the simplified design. A 3 dimensional solving technique, such as a finite element method, is then performed on the simplified design with the electric parameter incorporated. Performing the 3 dimensional solving technique on the simplified design speeds computation. Incorporating the electric parameter into the simplified design enables retention of the electrical impact of the signal transmission element on the package.

Figure 1:
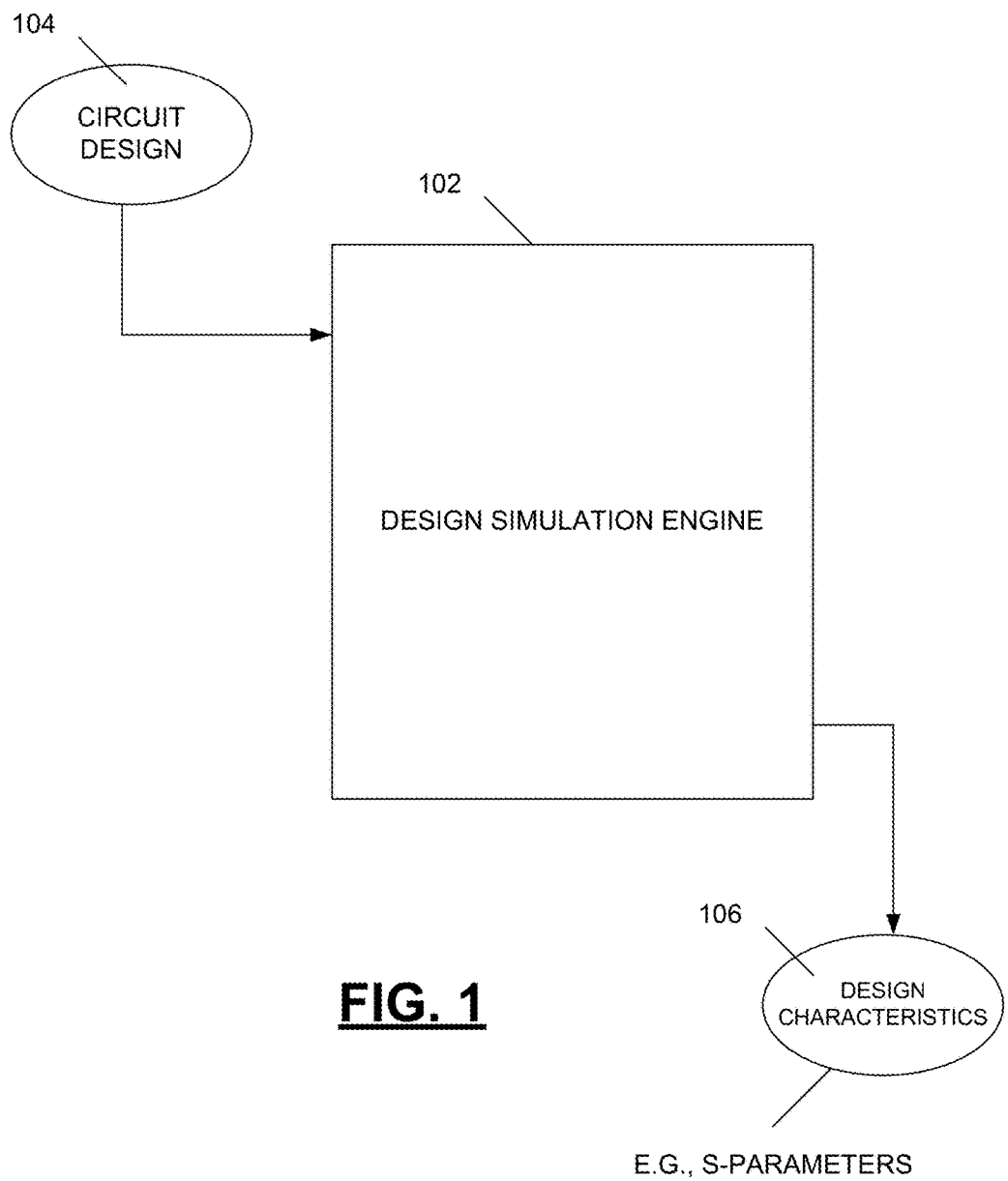
FIG. 1 is a block diagram depicting a processor-implemented design simulation engine.

FIG. 1 is a block diagram depicting a processor-implemented design simulation engine. A design simulation engine 102 receives a circuit design 104, such as an integrated circuit, an integrated circuit package, or a printed circuit board design. The design simulation engine 102 performs a simplification on the received design 104 that includes removal of at least one signal transmission element. An electrical parameter of the removed signal transmission element(s) (e.g., a voltage, a current, an electrical field, a magnetic field, a circuit element behavior) is determined. The simplified design is analyzed, such as via a finite element method, while considering the electrical parameter associated with the removed signal transmission element(s). The analysis determines a design characteristic 106 that is output from the engine 102. In one embodiment, the design characteristics 106 are S-parameters of the circuit design 104 that identify scattering parameters that describe the electrical behavior of the package design under stimuli of various electrical signals of different frequencies.

Figure 2:
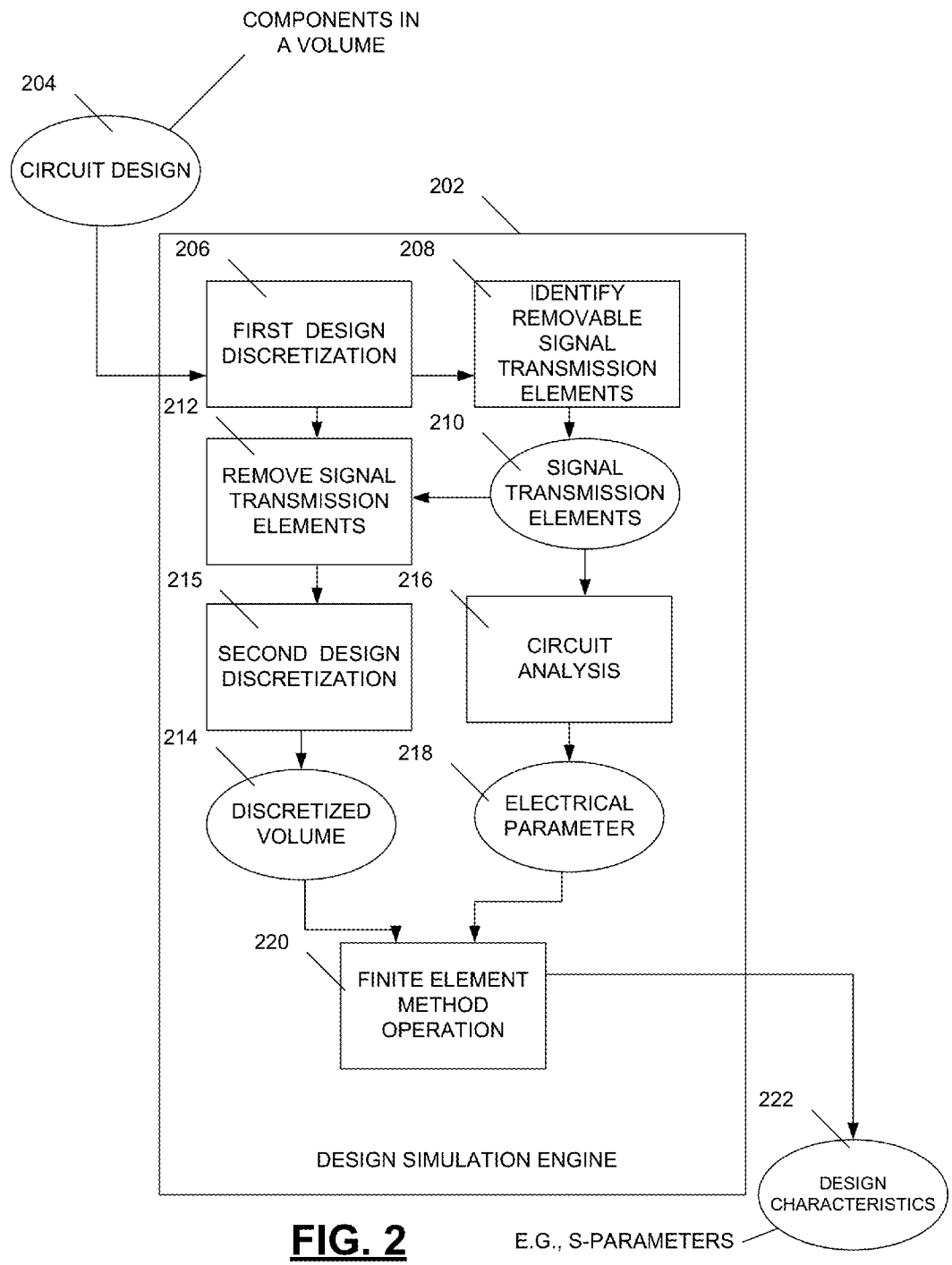
FIG. 2 is a block diagram depicting operations of a design simulation engine.

FIG. 2 is a block diagram depicting operations of a design simulation engine. The design simulation engine 202 receives a circuit design 204 that may take the form of a number of components arranged within a volume. At 206, the volume is discretized for a first time. In one embodiment, this discretization is at a 2 dimensional level, where a surface is broken into a plurality of triangles. The volume is analyzed at 208 to identify removable signal transmission elements 210, such as transmission lines, vias, solder balls, or solder bumps. The removable transmission elements 210 are utilized at 212 to modify the discretized volume by removing the signal transmission elements 210 to generate a simplified discretized volume. The simplified volume is further discretized, in one embodiment, at 215. In one example, that second discretization 215 is a three dimensional discretization that breaks the simplified volume into three dimensional portions, such as using a number of prisms or tetrahedrons. The removable signal transmission elements 210 are further analyzed at 216 to identify an electrical parameter 218 associated with those removable signal transmission elements 210. At 220, a 3 dimensional solving technique, such as the depicted finite element method operation, is performed using the simplified discretized volume 214 and the electrical parameter 218 to identify a design characteristic 222 that is output from the engine 202.

As noted above, a finite element method can be used to analyze the simplified discretized volume and the electrical parameter. In one example, a finite element method is performed as follows. A finite element method seeks to solve Maxwell's equations. In one example, those equations take the form of $$\nabla \times \frac{1}{\mu} \nabla \times E - \omega^2 \varepsilon E = -j\omega J \qquad (1)$$

where E is the electrical field, $\omega=2\pi f$ is the frequency, J is the electric current, and $\mu$ and $\varepsilon$ are material properties. In general, every quantity in equation (1) except for $\omega$ depends on a position x. For clarity, this dependence will usually not be shown explicitly. Solving this equation proceeds in three steps. The first is to convert it into the weak form. That is, instead of requiring the two sides to exactly match at each point in space, the system instead requires $$-j\omega \int W \cdot J dx = \int W \cdot \left( \nabla \times \frac{1}{\mu} \nabla \times E - \omega^2 \varepsilon E \right) dx \qquad (2)$$

$$= \int \nabla \times W \cdot \frac{1}{\mu} \nabla \times E - \omega^2 \varepsilon W \cdot E dx$$

for all functions W in a set. The Lax-Milgram theorem ensures that, given suitable conditions on J and W, the solution E exists and is unique. There remains, however, an infinite variety of choices for the testing functions W and, in addition, the question of how to represent E on a computer with finite memory.

The second step, then, is to approximate the solution using a finite number of computable basis functions w:

$$E(x) \approx \sum_{i=1}^{N} e_i w_i(x) \qquad (3)$$

Similarly, a finite basis is chosen for the testing functions; the common case of using the same basis for E and W is called Galerkin's Method. This results in an N×N system of linear equations $$Ae=j \qquad (4)$$

with $$A_{ij} = \frac{1}{j\omega} \int \nabla \times w_i \cdot \frac{1}{\mu} \nabla \times w_j - \omega^2 \varepsilon w_i \cdot w_j dx \qquad (5)$$

$$j_i = -\int w_i \cdot J dx, \qquad (6)$$

To obtain the finite element method (FEM), the final step is to specify that the basis functions w should be piecewise polynomials that have local support (i.e., they are nonzero only in a relatively small region of space). Polynomials are used because of their excellent approximation properties, while local support implies that most of the matrix entries $A_{ij}$ in equation (5) will be zero because all but a few pairs of $w_i$ and $w_j$ do not overlap. This can reduce the amount of memory needed to store A. A's sparseness can be exploited when solving equation (4). As rough guidelines, an 8 GB desktop computer could only solve problems up to about 20,000 unknowns if all $N^2$ matrix entries had to be stored. Using a finite element method, problems with up to approximately 2 million unknowns can be solved in a few minutes, while large-memory servers can handle N~ 30 million.

FIG. 3 is a diagram depicting prism basis functions. In one embodiment, a first step in obtaining basis functions with local support is to decompose the design geometry into thousands or millions small polyhedrons called elements, which taken together comprise the finite element method mesh. Each basis function is nonzero inside only a small number of elements. Tetrahedrons are often utilized because they can be combined into general shapes. In other embodiments layers are used, such as embodiments used to model printed circuit boards and packages, which are usually layered structures. The structure being analyzed can be divided into layers along the z-axis such that the cross section in the xy-plane does not change within a layer. In such cases, it may be more efficient to generate a 2 dimensional triangular mesh of the cross section and extrude it along the z direction, forming prism elements, as shown in FIG. 3. In one example this is done independently for each layer. In other examples, the initial 2 dimensional mesh is a composite based on the superposition of all the layers' cross sections.

Within each prism a system defines the basis functions. In one embodiment, a system creates scalar functions and uses them to model the x, y, and z components independently. In the more typical embodiment, the degrees of freedom are associated with the vector component parallel to the edges, as shown in FIG. 3. They are customarily normalized such that the integral of the tangential component along the edge is equal to one.

Printed circuit boards and packages may contain features that are efficiently modeled as lumped circuit elements, such as decoupling capacitors, termination resistors, and power delivery network models. Thus, it can be beneficial to have a hybrid process that models the interactions between the field domain, governed by Maxwell's equations, and the circuit domain, governed by Kirchoff's laws.

To this end, the original finite element method system of equation (4) is extended to include the circuit unknowns v, giving $$\begin{pmatrix} A_{11} & A_{12} \\ A_{21} & A_{22} \end{pmatrix} \begin{pmatrix} e \\ v \end{pmatrix} = \begin{pmatrix} 0 \\ f \end{pmatrix}. \quad (7)$$

where $A_{11}$ is the original finite element method matrix (previously identified as A), $A_{22}$ is the modified nodal analysis (or "admittance" or "Y") matrix, and blocks $A_{12}$ and $A_{21}$ govern the interaction between the two. The right hand side of equation (7) is simplified to reflect that excitations are only present on the circuit side of the equations.

Figure 4:
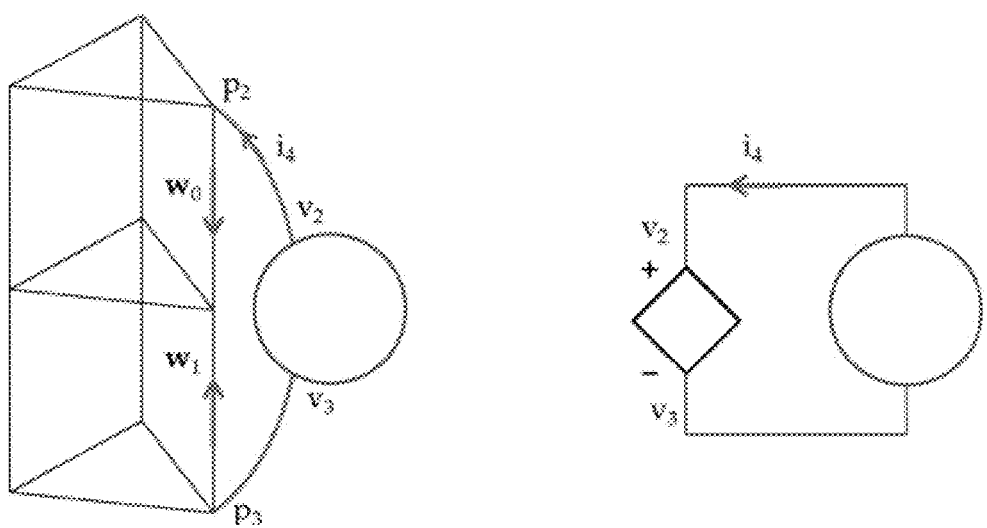
FIG. 4 is a diagram depicting a circuit component connection.

FIG. 4 is a diagram depicting a circuit component connection. The interactions can be modeled by assuming a two terminal circuit connected to two points in a mesh, $p_2$ at the positive terminal at $p_3$ at the negative, as shown in FIG. 4. There is a path between those points, through edges with basis functions $w_0$ and $w_1$, oriented as shown and having unknowns $e_0$ and $e_1$. The voltage can be approximated using the DC expression:

$$v_2 - v_3 = \int_{p_2}^{p_3} E \cdot dl = e_0 - e_1. \quad (8)$$

This provides the coupling from the FEM domain to the circuit domain. It is conceptually similar to the voltage-controlled voltage source circuit element, except that it is controlled by electric fields instead of voltages. To complete the feedback, the current $i_4$ through the dependent voltage source is measured and injected into the finite element method domain as a volumetric line current:

$$J(x) = i_4 \int_{p_2}^{p_3} \delta(x - x') dl'. \quad (9)$$

The negative sign appears because the injected current should model the current through the circuit connected to the dependent source, which is equal and opposite the current through the source itself. For example, if $v_2 > v_3$ and the connected circuit is simply a resistor, then $i_4$ should be negative and the injected current should flow from $p_2$ to $p_3$. When tested against the basis functions, equation (6) gives $$-\int \begin{pmatrix} w_0 \\ w_1 \end{pmatrix} \cdot J dx = i_4 \int_{p_2}^{p_3} \begin{pmatrix} w_0 \\ w_1 \end{pmatrix} \cdot dl = i_4 \begin{pmatrix} 1 \\ -1 \end{pmatrix}. \quad (10)$$

Because this is a dependent source, its contribution appears in the $A_{12}$ block of equation (7), with the opposite sign, and the FEM part of the right-hand side is still zero. This can be combined with the voltage expression to yield the modified nodal analysis stamp:

|   | $e_0$ | $e_1$ | $v_2$ | $v_3$ | $i_4$ |
|---|---|---|---|---|---|
| 0 |   |   |   |   | $-1$ |
| 1 |   |   |   |   | 1 |
| 2 |   |   |   |   | 1 |
| 3 |   |   |   |   | $-1$ |
| 4 | $-1$ | 1 | 1 | $-1$ |   |

There are two situations that significantly contribute to the number of unknowns becoming so large that solving the resulting matrix equation is impractical. The first comes from the fact that accurately determining the characteristic impedance and delay of a signal net often utilizes a very fine mesh to accurately capture the rapidly-varying fields in the vicinity of the conductor's edges. While mesh edge lengths of 200 microns may be adequate for power or ground planes, signal conductors require lengths on the order of 30 microns along the direction of propagation and 10 microns in the tangential direction. Thus, for a given layout area, signal conductors can require more than 100 times as many unknowns compared to power and ground conductors. Second, the power delivery network on a package can consists of tens of thousands of vias, together with thousands more pads and antipads. When all of these polygons are unioned together and meshed, the resulting 3 dimensional finite element method problem can approach 100 million unknowns.

In some cases, modeling all of these features with the full generality of the finite element method has been discovered to be excessive. Rather, in the case of the signal nets, there exist regions of the design that consist only of several uniform transmission lines. A system typically seeks information on the propagation of a single guided mode per line, together with its coupling to a few nearby lines. Likewise, certain vias can be accurately modeled as a small lumped circuit representing the resistance, inductance, and capacitance to nearby planes. Therefore, it would be beneficial to identify regions of uniform transmission lines and simulate them with simplified models, leaving only the complex parts of the geometry for the finite element method. In this way, each signal net is analyzed with only a few dozen unknowns, regardless of its length. Removing the power and ground via barrels, pads, and antipads can also significantly reduce the complexity.

Systems and methods as described herein, in one embodiment, identify signal nets that can be accurately modeled as uniform transmission lines (power and ground nets are sometimes not processed because they tend to be too irregular in shape), as well as vias that can be modeled as lumped circuit elements. In some designs, it is possible that signal nets and vias will connect to each other, interacting at borders, as further discussed herein.

Figure 5:
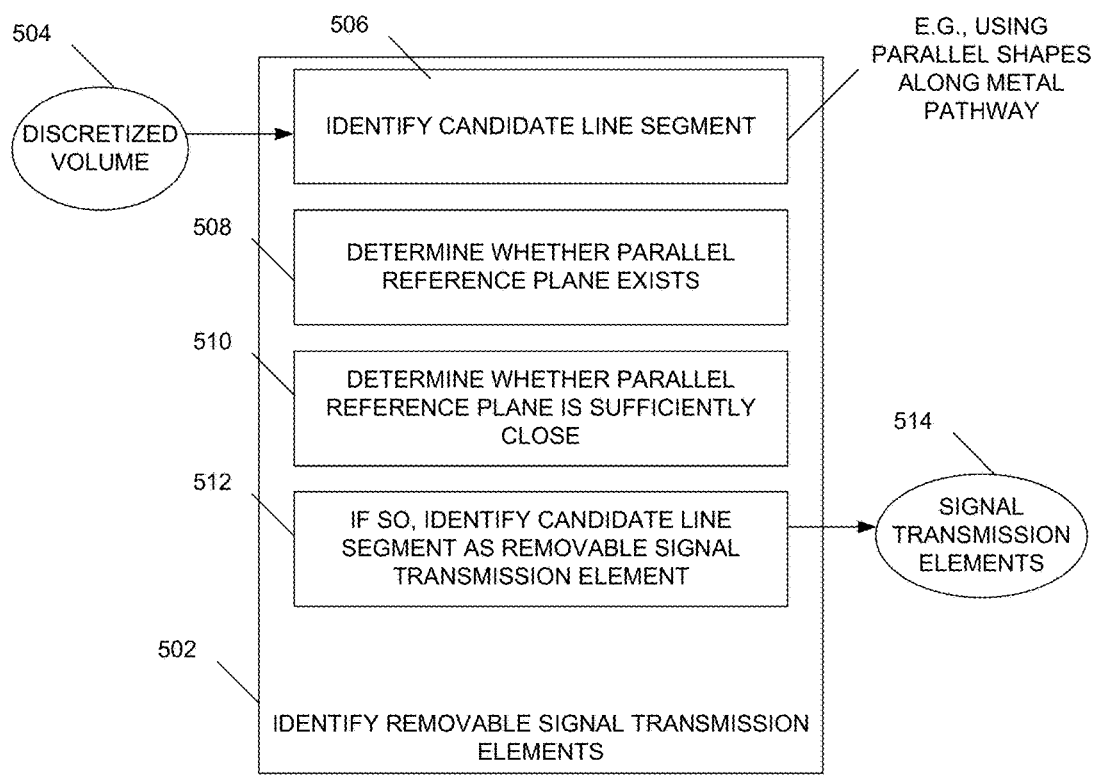
FIG. 5 is a diagram depicting an example process for analyzing a signal net to identify removable signal transmission elements.

FIG. 5 is a diagram depicting an example process 502 for analyzing a signal net to identify removable signal transmission elements. A discretized volume 504 is received and candidate sections for transmission line modeling are identified at 506. Note that the sections identified in the first step are called "candidates." A system may discover that a particular area is not suitable for transmission line modeling, perhaps because there are no reference planes above or below, or those reference planes are too far away. If any candidate segments are rejected, they can be considered by the 3 dimensional solver, such as a finite element method solver.

The determination is made at 508 as to whether sufficient parallel reference planes for the candidate segment are present and whether such references planes, if they exist, are sufficiently close at 510. If so, at 512, the candidate line segment is identified as a removable signal transmission element 514 and is clipped from the geometry so that that segment will not be modeled in the finite element method domain.

Figure 6:
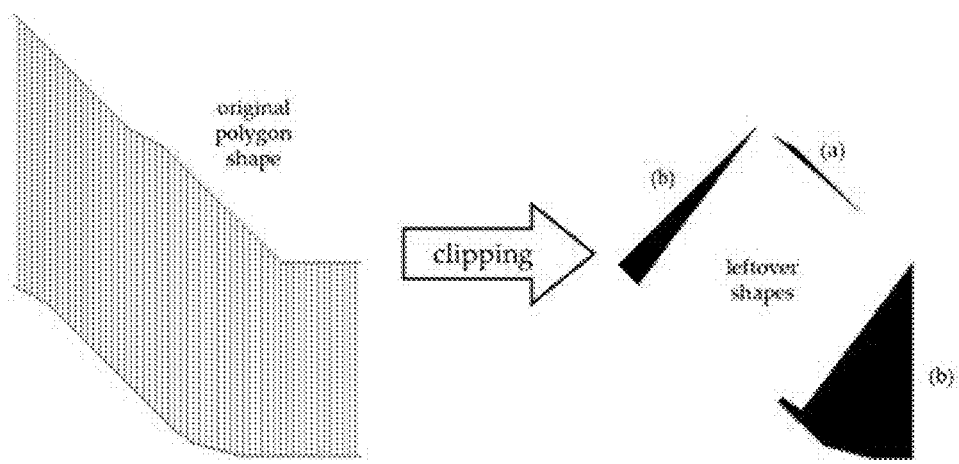
FIG. 6 is a diagram depicting identification of candidate segments and determining how to handle metal portions that remain after candidate signal identification.

FIG. 6 is a diagram depicting identification of candidate segments and determining how to handle metal portions that remain after candidate signal identification. The candidate line segment identification step begins by processing each signal net polygon to identify rectangular-shaped sections that have uniform width and a sufficiently large length-to-width ratio. The identified candidate line segments are analyzed (e.g., analyzed according to 508 and 510 of FIG. 5) to see whether any should be rejected and kept in the discretized volume. From these identified candidate line segments, any shapes that were determined to be kept in the discretized volume geometry are kept. The remaining candidate line segment polygons are identified as removable signal transmission elements that are then subtracted from the original geometry.

In some implementations, this process leaves small leftover shapes that may be undesirable to model in the finite element method domain, as shown in FIG. 6(b). Certain leftover shapes may result, for example, when the sides of the underlying signal net are not exactly parallel, so that clipping with a rectangle results in a tiny sliver along the edge. In addition, the candidate segment may not extend into a bend, leaving behind a wedge-shaped piece after clipping. Depending on the area of the leftover piece, it may be dropped from the discretized volume geometry or retained (e.g., large leftover pieces remain, while small leftover pieces are discarded and ignored). In addition, if a leftover piece touches exactly two clipping rectangles, it may be replaced with a short transmission line section connecting the two touch-points, so as not to leave any gaps and open-circuit the line.

Figure 7:
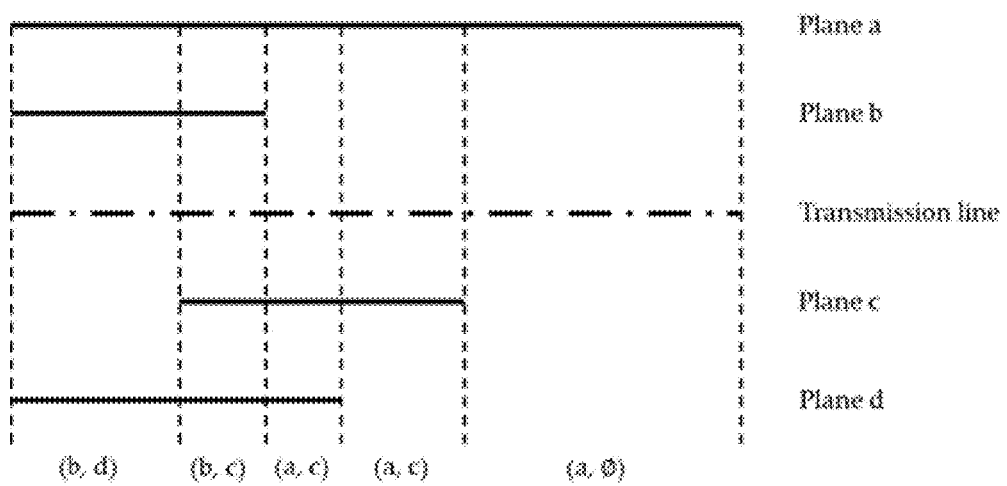
FIG. 7 is a diagram depicting identification of transmission line segments.

FIG. 7 is a diagram depicting identification of transmission line segments. After the transmission line sections have been removed from the geometry, they are examined to determine the nearest reference plane above and below. This is accomplished by first checking which power or ground shapes contain an (x,y) point just inside one end of the line and choosing the nearest shape above (if any) and the nearest shape below (again, if present). Then, proceeding along a straight line to the other end of the transmission line, the nearest shapes are updated whenever crossing the boundary of a power or ground polygon. FIG. 7 shows a sample line, viewed from the side, crossing several different reference planes. In this way, what was initially one transmission line may be subdivided into several segments, each having the same pair of polygons above and below for its entire length. It is acceptable for one, but not both, of these polygons to be missing. If there is a segment for which no polygon can be found above or below, then that segment is not suitable for transmission line modeling, and it should be reinserted into the finite element method domain.

Figure 8:
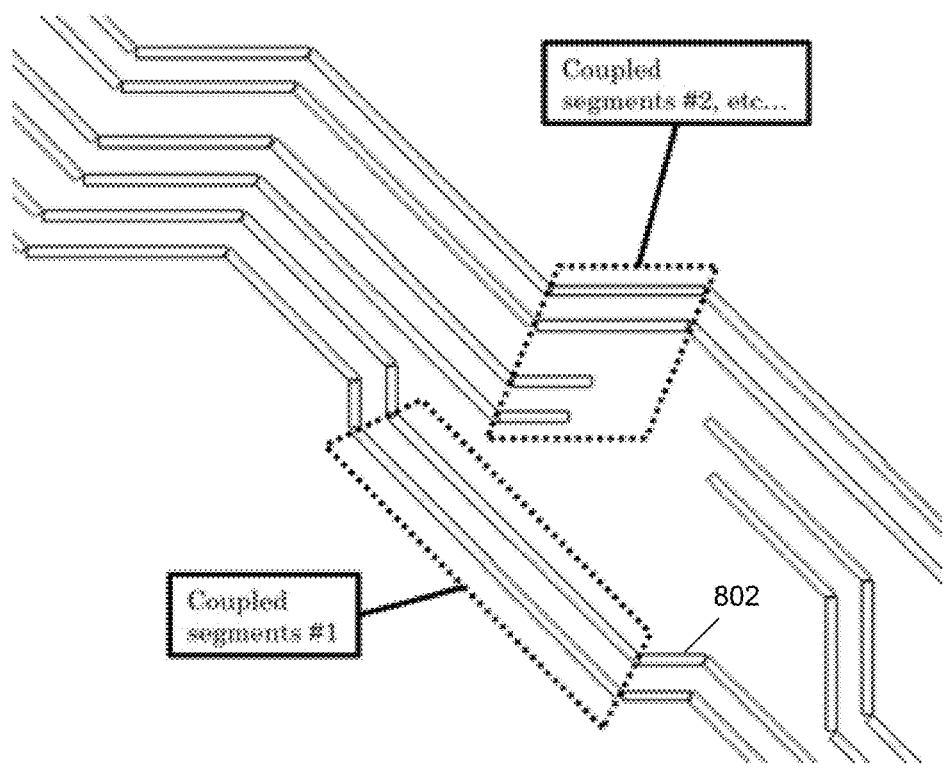
FIG. 8 is a diagram depicting transmission line segments having same reference planes, coupled based on proximity and parallelism.

Once all the transmission line segments sharing the same pair of reference planes have been collected together, they can be further grouped based on whether they are close enough that the coupling, or crosstalk, should be modeled. Because, in one embodiment, a system generates circuit models for groups of lines with uniform cross section, grouped lines are selected to be sufficiently parallel. The other condition, in one example, for two segments to be considered coupled is that their separation be considered small relative to the other properties of the lines, such as their width and the distance to the nearest reference plane. This is illustrated for two groups of segments in FIG. 8. FIG. 8 is a diagram depicting transmission line segments having same reference planes, coupled based on proximity and parallelism. The two groups (#1 and #2) are not coupled to each other because they are not parallel. In addition, the other horizontal segments to the right of group #1 at 802 are not coupled to group #2, because they are too far away.

Figure 9:
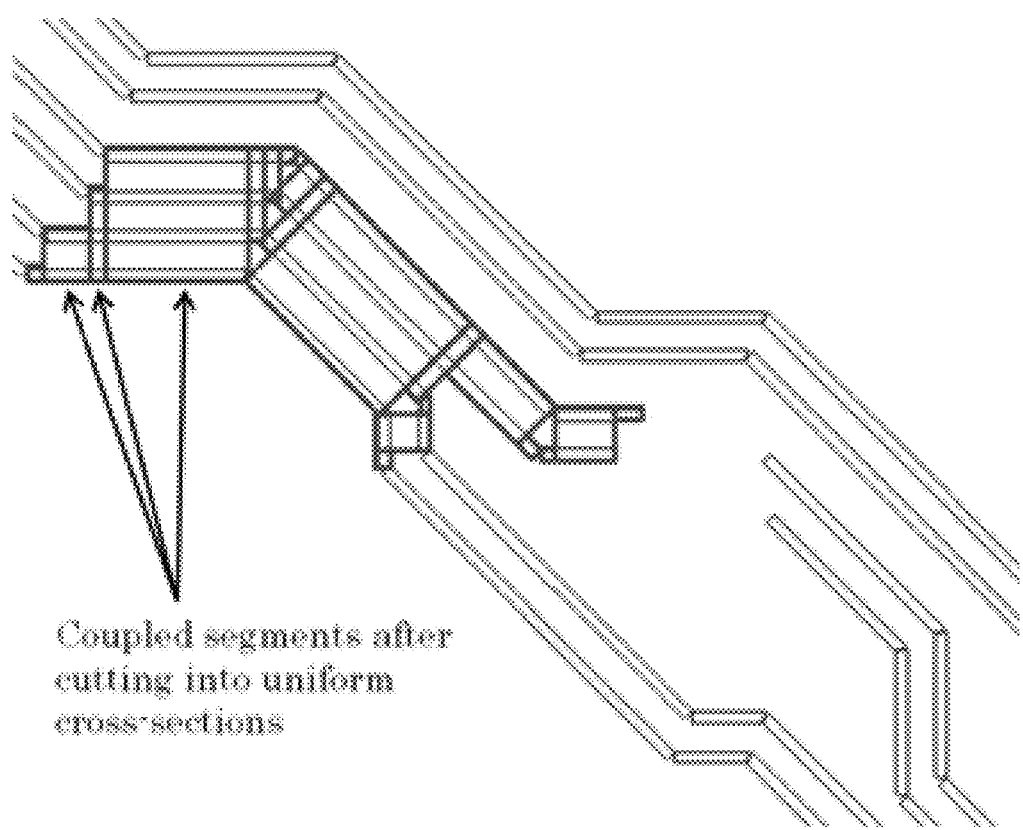
FIG. 9 is a diagram depicting boxes that enclose coupled transmission line segments having uniform cross sections.

After identifying nearby, parallel segments, a system generally does not have constant cross sections yet, because the coupled segments do not necessarily begin and end at the same location along the direction of propagation. In one embodiment, a system then generates a cutting plane at the beginning and end of each segment, perpendicular to the propagation direction, and subdivides all coupled segments that it intersects. FIG. 9 is a diagram depicting boxes that enclose coupled transmission line segments having uniform cross sections. By collecting all the resulting segments lying between two consecutive cutting planes, a system obtains the uniform, constant-cross-section regions. FIG. 9 shows several of the segments of FIG. 8 after this cutting step, with the uniform sections outlined by the bold lines.

The individual cross sections are then analyzed to determine how they interact with the finite element method domain and their appropriate circuit model. Connecting the transmission line segments between two different sections is straightforward if they share the same reference planes. Because the references are the same, the voltage value on the two lines are commensurate, so a system can assign a single circuit node (e.g., a SPICE circuit node) to the junction and stamp the transmission line Y matrices as usual. If the reference planes are different, however, then there is no guarantee that they are at the same voltage. In such cases, the circuit model seeks to account for the apparent voltage discontinuity at the junction. There are a variety of cases, depending on whether the left and right sides of the junction are a microstrip, stripline, or even a metal shape from the finite element method domain. However, they can all be handled, in one embodiment, as follows.

1. A finite element method-controlled voltage source is created for each reference plane, regardless of which side of the junction it is on, measuring the vertical electric field from the reference plane to the junction point. If two sources come from the same side of the junction (i.e., there is a stripline on that side) either connect the sources in series or combine them into a single controlled source.
2. Adjust the weight of each controlled sources in proportion to the distance to the opposite reference plane. For example, the weight of the lower plane's source is $$\alpha_{lower} = \frac{h_{above}}{h_{above} + h_{below}},$$

with the convention that if there is no reference plane above (resp. below), then $h_{above}$ ($h_{below}$) is a very large finite number, e.g., DBL_MAX in C/C++ (or infinity, with the understanding $\infty/\infty \equiv 1$).

3. Choose any one source on the left and right sides and give these sources the same current unknown.
4. Choose either the left or right side sources, and reverse the reference direction for the current. Practically, since the reference direction is fixed relative to the positive and negative terminals, by convention, this means swapping the terminals and negating the weights.

Following are examples illustrating this process.

Figure 10:
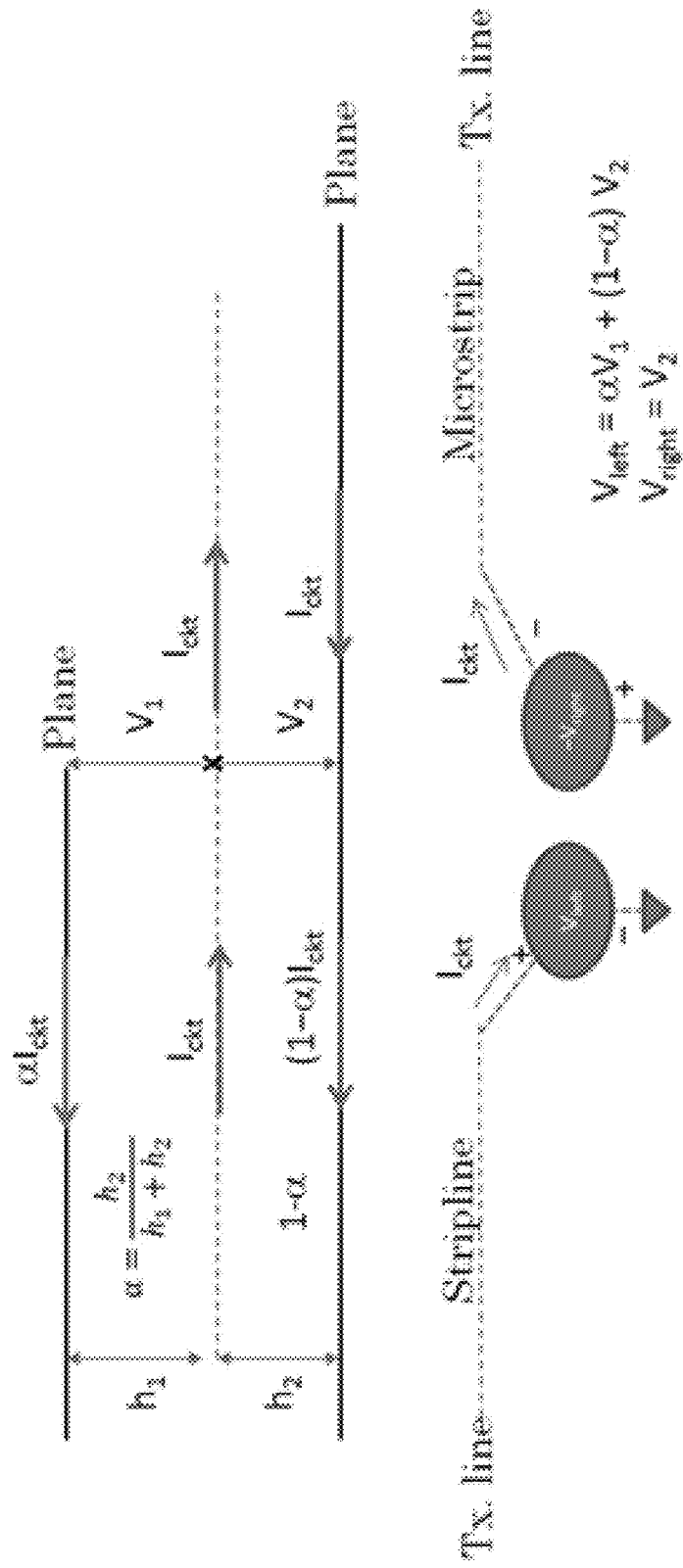
FIG. 10 is a diagram depicting a circuit model for a stripline to microstrip junction.

FIG. 10 is a diagram depicting a circuit model for a stripline to microstrip junction. FIG. 10 shows a junction between a stripline on the left and a microstrip on the right. The source corresponding to the stripline voltage has been combined. The weights from the upper and lower reference planes are $$\alpha_{upper} = \frac{h_2}{h_1 + h_2}$$

$$\alpha_{lower} = \frac{h_1}{h_1 + h_2} = 1 - \alpha_{upper}.$$

Because the right side is a microstrip and was chosen to be reversed in step 4, as described above, its final weight is −1. If the other side had been chosen in step 4, the solved voltages would be the same. The only difference would be a changed sign in the solved value for $I_{ckt}$, because the reference direction would be opposite. Note also that there is a discontinuity in the return current on the lower plane. This requires an injected current of $\alpha I_{ckt}$ in the finite element method domain from the lower plane to the upper. This can be achieved by taking the voltage weights for each source and scaling the injected current by the same amount. Thus, along the $V_1$ prism edge, the injected current is $\alpha I_{ckt}$. For the $V_2$ edge both sources contribute. Their sum is $$I_2 = [(1-\alpha) \cdot I_{ckt}] + [(-1) \cdot I_{ckt}] = -\alpha I_{ckt},$$ (12)

as desired, given the opposite reference direction. This also maintains the symmetry of the circuit stamp:

| $e_1$ | $e_2$ | $V_{left}$ | $V_{right}$ | $I_{ckt}$ |
|---|---|---|---|---|
|  |  |  |  | $\alpha$ |
|  |  |  |  | $-\alpha$ |
|  |  |  |  | 1 |
|  |  |  |  | −1 |
| $\alpha$ | $-\alpha$ | 1 | −1 |  |

By using the same current unknown for both sources, the system ensures continuity between the two transmission line currents.

Figure 11:
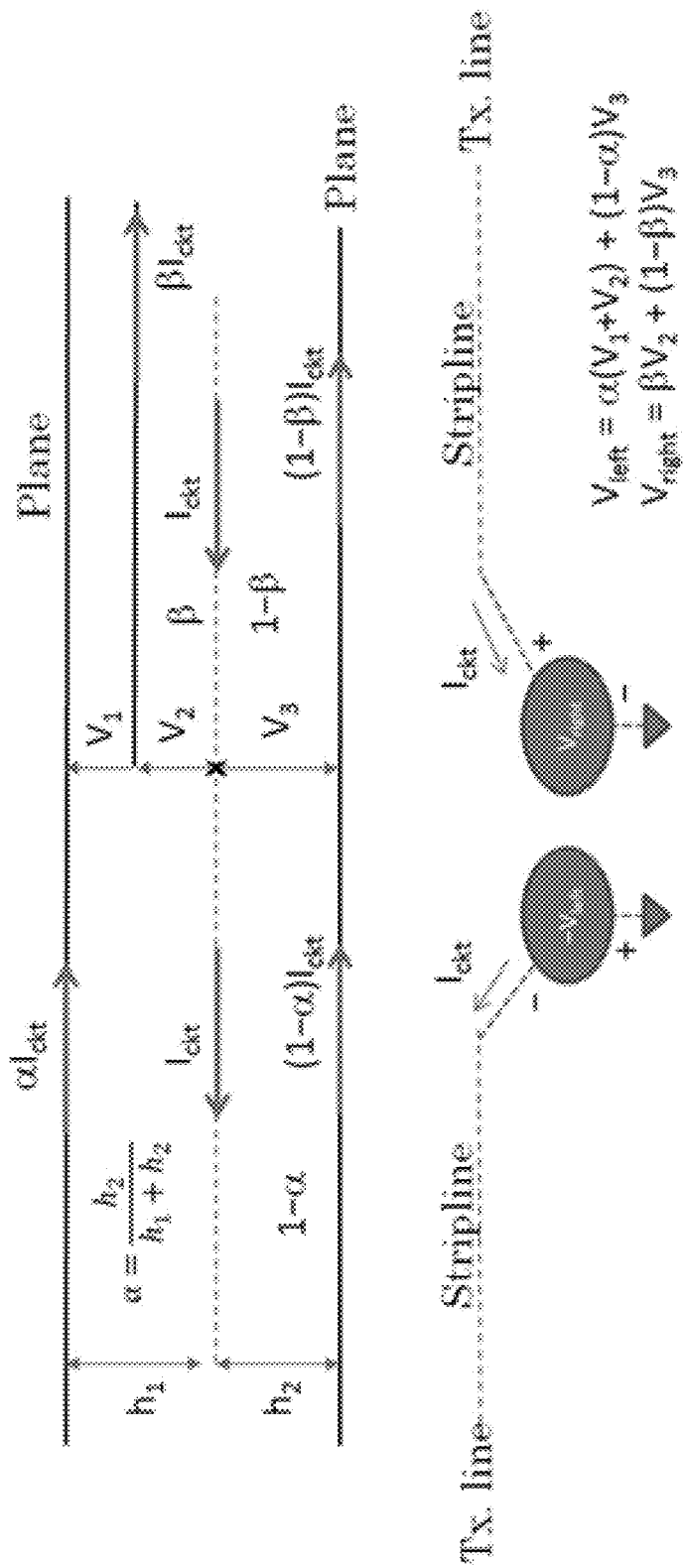
FIG. 11 is a diagram depicting a circuit model for a stripline to stripline junction.

FIG. 11 is a diagram depicting a circuit model for a stripline to stripline junction. FIG. 11 depicts a junction between two striplines with different reference planes. In this example, the left source has its polarity reversed. A system can verify that the injected finite element method current correctly accounts for the upper and lower return current discontinuities, keeping in mind that $I_3$ has the opposite orientation:

$$I_1 = [(-\alpha) \cdot I_{ckt}] + 0 \qquad = -\alpha \cdot I_{ckt}$$ (14)
$$I_2 = [(-\alpha) \cdot I_{ckt}] + [(\beta) \cdot I_{ckt}] \qquad = (\beta - \alpha) I_{ckt}$$
$$I_3 = [(\alpha - 1) \cdot I_{ckt}] + [(1 - \beta) \cdot I_{ckt}] = (\alpha - \beta) I_{ckt}$$

Figure 12:
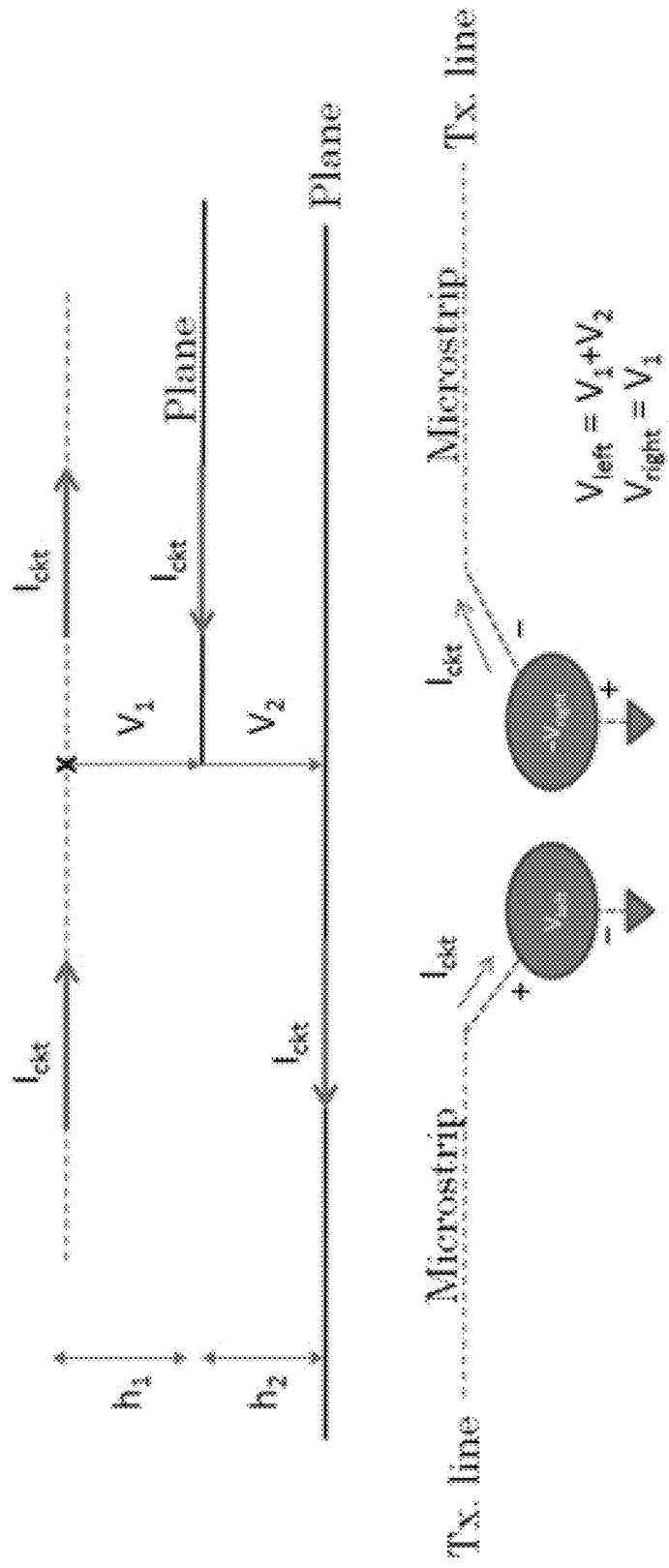
FIG. 12 is a diagram depicting a circuit model for a microstrip to microstrip junction.

FIG. 12 is a diagram depicting a circuit model for a microstrip to microstrip junction. In the example of FIG. 12, a system can verify the injected currents according to:

$$I_1 = [(1) \cdot I_{ckt}] + [(-1) \cdot I_{ckt}] \quad = 0$$ (15)
$$I_2 = [(1) \cdot I_{ckt}] + 0 \qquad = I_{ckt}$$

The transmission line admittance matrix can then be analyzed by modeling the coupled, uniform transmission lines. In one example, a system generates the per-unit length R, L, C. and G matrices. These are parameters in the vector telegrapher's equation $$\frac{dV}{dx} = -(R + j\omega L)I$$ (16)

$$\frac{dI}{dx} = -(G + j\omega C)V.$$

Using the matrix square root function, the system derives the system propagation and characteristic admittance matrices, $$\Gamma = \sqrt{(G+j\omega C)(R+j\omega L)}$$ (17)

$$Y_0 = \Gamma^{-1}(G+j\omega C).$$ (18)

Because the RLCG parameters are matrices, the order of multiplication, in general, is not commutative. Working through the differential equation (19), the system determines the solution, again in terms of matrix functions, to be $$Y = \begin{bmatrix} \coth(\Gamma l) & -\operatorname{csch}(\Gamma l) \\ -\operatorname{csch}(\Gamma l) & \coth(\Gamma l) \end{bmatrix} \begin{bmatrix} Y_0 & 0 \\ 0 & Y_0 \end{bmatrix},$$ (19)

where l is the length of the transmission lines.

Figure 13:
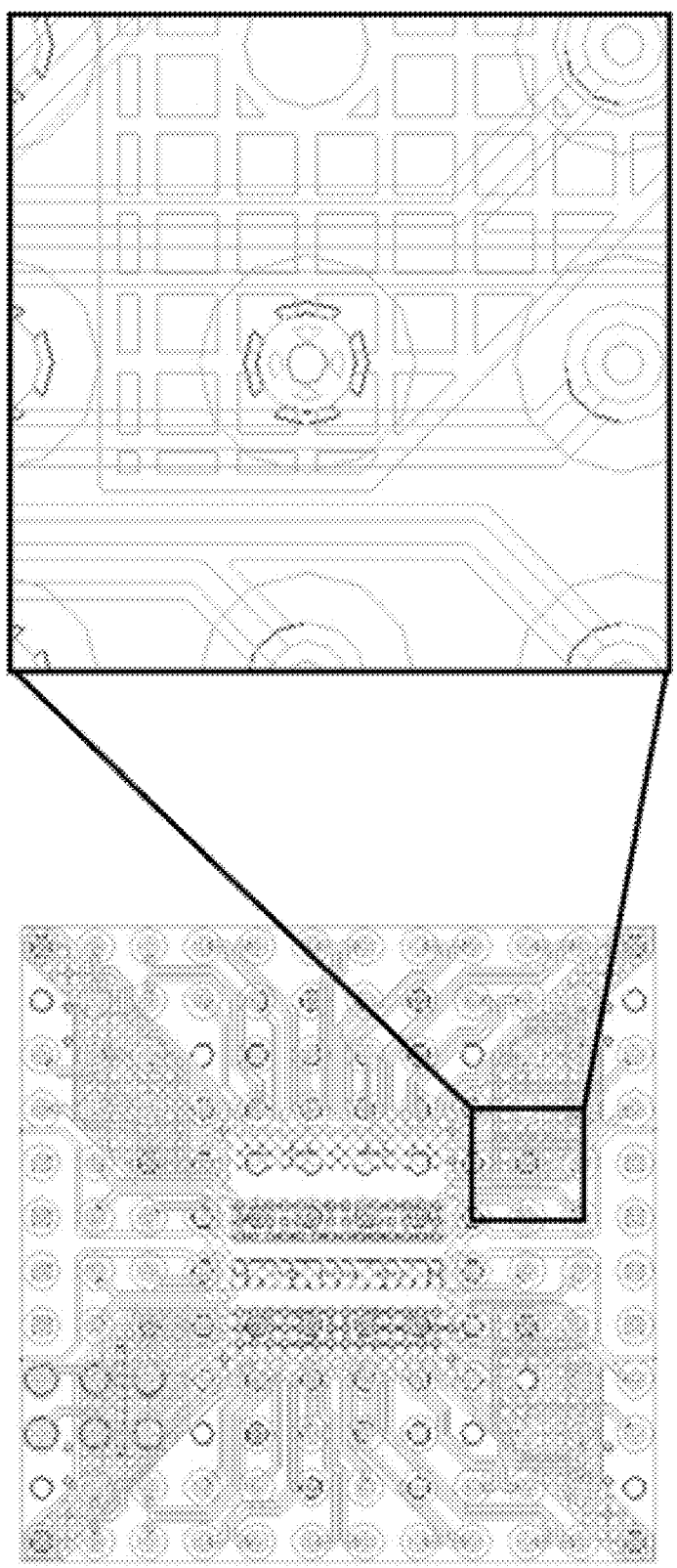
FIG. 13 is a representation of detail of a composite 2 dimensional geometry for a complex package model.

While transmission line modeling of signal nets can greatly improve the speed and capacity of signal integrity analysis, it is often of limited benefit for power integrity (PI) analysis. The difficulty with PI simulation is not the mesh refinement around the metal shapes. Indeed, power and ground nets are typically large and irregularly shaped, so it can be difficult to meaningfully decompose them transmission line segments. The number of vias and antipads can be quite large. A large package design can contain thousands of vias on each layer, with the pads being slightly different in shape and orientation from one layer to the next. FIG. 13 is a representation of detail of a composite 2 dimensional geometry for a complex package model. As seen in FIG. 13, when the polygons from each layer are superimposed to create the composite 2 dimensional mesh, the resulting pattern can be quite dense. The resulting 3 dimensional prism mesh can have tens of millions of unknowns. By removing the via barrels from the geometry and replacing them with injected circuit currents along the vertical edges, the number of unknowns are reduced significantly. In addition, by removing the pads and filling the antipads in, the number of triangles can be reduced to a few hundred-thousand and the unknowns to less than 10 million.

While this process works well for certain vias, vias of certain types may not be amenable to such simplification. The process of determining which vias are suitable for hybridization is largely one of exclusion. Most vias are assumed to be suitable, and a few categories of special cases, which are known to have accuracy issues, are excluded. Simplifying vias used to represent the solder bumps and balls at the top and bottom of the package can be especially difficult. Due to their size and proximity to ports, these are potentially difficult to model accurately as circuit elements. Thus, in some embodiments, such vias are excluded. Also excluded in one example are vias going through thick core layers, which, due to their length and large diameter, suffer more when replaced with line currents.

Identifying small metal pads that can be replaced with a circuit junction is also beneficial because removing such pads and filling in their antipads can significantly simplify the geometry and mesh. In one embodiment, the following criteria for a pad to be removable are used. The candidate:
1. is smaller than three times the area of the largest via landing inside;
2. does not have any connections to (a) circuit components, (b) ports, (c) wirebonds, or (d) through-silicon vias; and
3. contains only hybrid vias.

Furthermore, in one example, for an antipad to be filled it must:
1. not contain any metal shapes;
2. have at least 10% of its area filled with metal shapes before any pads were deleted; and
3. be smaller than particular tolerance that is problem-dependent but typically a fraction of a millimeter.

The via models can represented as a component, as shown in FIG. 4, with the circuit consisting of a resistor with the via's DC resistance. Skin effect is ignored, in one embodiment, because PI analysis is generally limited to a few hundred megahertz, at which point skin depth is large compared to typical via diameters. A circuit inductor may not be included because the injected current in the finite element method domain generates its own magnetic field, giving rise to an inductive effect.

For a single via connecting two metal shapes, no further circuit handling is required. It is, in one example, sufficient to ground the negative terminal of the controlled source and the negative terminal of the resistor (meaning the terminal not connected to the source's positive terminal). It is possible for two vias to appear in series, perhaps because the designer has created several vias spanning one layer each instead of a single long via. This situation is not much more difficult for a system. The individual via circuit can be connected in series, and the unconnected terminals of the first and last circuits are grounded.

Pads on which more than one via lands are slightly more complicated. The first step is to create a circuit voltage node for each distinct (x, y) point where a via lands and to connect all of the via circuit terminals to the corresponding nodes. At this point, the case of one via or two vias landing at the same point from above and below, is correctly handled. The current will either be open- or short-circuited, as the case may be.

If there are two or more via locations then they are connected in the circuit domain to prevent open circuits (if there is an antipad) or short circuits (if the antipad is filled). One mechanism for achieving this would be to choose one of the locations and attach a finite element method-controlled source from there to every other location. This may be suboptimal in some implementations because it forces the injected currents to always flow through this one location, resulting in a longer path length and higher inductance. In another example, a system could connect a source between every pair of locations. But this, in certain implementations, could result in an excessive number of current unknowns. Another option is to form a Delaunay triangulation of the locations and insert a source for each edge. FIG. 14 depicts such a circuit for three hybrid vias connected to remove a pad.

An additional case handles a removed transmission line element connecting to a pad. This location, in one example, is first connected to the via locations on the pad as described above. Then, a system connects the transmission line's controlled source to the corresponding pad node. It may be necessary, however, to ground this node, so that the voltage across the transmission line's source is the actual, absolute voltage applied to the line. FIG. 15 is a diagram depicting a circuit for a removable pad with hybrid transmission line connections. In such cases, it is Maxwell's equations in the finite element method domain, rather than Kirchhoff's current law, that enforces current continuity at the grounded node.

Figure 16:
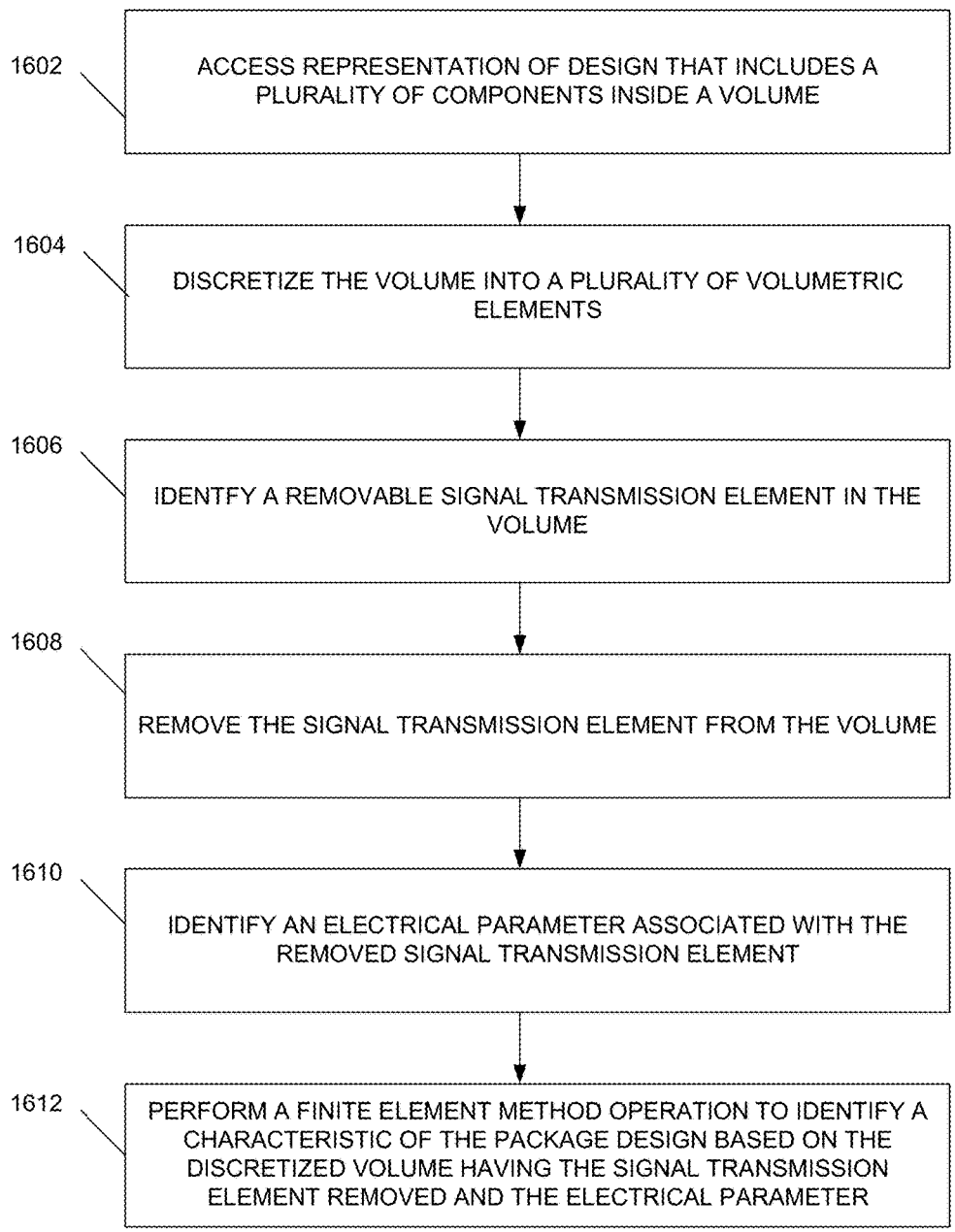
FIG. 16 is a diagram depicting a computer-implemented method of performing a simulating of an integrated circuit, an integrated circuit package, or a printed circuit board design.

FIG. 16 is a diagram depicting a computer-implemented method of performing a simulating of an integrated circuit, an integrated circuit package, or a printed circuit board design. At 1602, a representation of the design is accessed that includes a plurality of components inside a volume. The volume is discretized at 1604 into a plurality of volumetric elements. A removable signal transmission element is identified in the volume at 1606. At 1608, the signal transmission element is removed from the volume. At 1610, an electrical parameter associated with the removed signal transmission element is identified. A finite element method operation is performed at 1612 to identify a characteristic of the design based on the discretized volume having the signal transmission element removed and the electrical parameter, an electrical impact of the signal transmission element on the package being retained based on the electrical parameter.

Systems and methods as described herein significantly improve the function of computer systems. To illustrate the improved performance of computers utilizing the systems and methods described herein, five experiments were performed that compared computer performance using existing methodologies versus using simulation systems and methods as described in this application. Results of the comparisons for practical test cases with varying degrees of complexity are summarized in the table below. The performance improvements, in terms of the number of unknowns to be considered, matrix solution time, and memory usage, range from a factor of 2× to over 30×. The last two cases are particularly notable. Case 4 is a large 12-layer package with over 15,000 pins connecting to the die. Moreover, the vias inter-connecting these layers are all slightly offset from each other, and the metal planes connecting them on a particular layer use different patterns (e.g., different antipad diameters; solid planes vs. diagonal cross-hatching; etc.). This significantly increases the computational complexity when using the traditional approach. But the proposed method handles the vast majority of these details efficiently, thus reducing the problem complexity by 9.4× and bringing down the memory usage by 9.5×.

| Case | Problem Size (millions of unknowns) | | | Matrix Solve Time (min.) | | | Peak Memory (GB) | | |
|---|---|---|---|---|---|---|---|---|---|
| | Existing | Proposed | Gain | Existing | Proposed | Gain | Existing | Proposed | Gain |
| 1 | 8.2 | 5.2 | 1.6x | 17.2 | 8.6 | 2.0x | 25.0 | 18.0 | 1.4x |
| 2 | 27.1 | 14.7 | 1.8x | 113.8 | 51.0 | 2.2x | 95.4 | 66.9 | 1.4x |
| 3 | 7.6 | 3.4 | 2.2x | 11.4 | 3.7 | 3.1x | 20.9 | 9.2 | 2.3x |
| 4 | 39.4 | 4.2 | 9.4x | 198.8 | 6.4 | 31.1x | 126.8 | 13.4 | 9.5x |
| 5 | 59.1 | 11.8 | 5.0x | N/A | 51.1 | N/A | >256 | 49.9 | >5.1x |

Case 5 is even more extreme, with 19,000 pins on the IC die and 14 layers in the package. As a result, this case fails to solve even on a large 256 GB workstation with the traditional approach. The proposed method allows this project to be successfully analyzed with less than 64 GB of memory in less than an hour, thus highlighting the effectiveness of the proposed methodology.

This application uses examples to illustrate the invention. The patentable scope of the invention includes other examples. In one example, a circuit design is received. A box is constructed completely enclosing the geometry of interest in the design. The interior of the box is discretized into volumetric elements, such as prisms or tetrahedrons. 3-dimensional volumetric elements are used with tangential vector finite element method models to model field components. Geometric objects, such as vias, pads, and transmission lines are identified and removed from the computational block. Parasitics of individual removed objects are extracted and connected to the 3-dimensional volumetric mesh. A full matrix system is assembled in terms of electric/magnetic fields of the volumetric elements coupled with the object parasitic, such as via modified nodal analysis techniques. The system is then solved to obtain S-parameters.

What is claimed is:

1. A computer-implemented method of creating or modifying a physical electronic device by performing a simulation of an integrated circuit, integrated circuit package, or printed circuit board design, comprising:
   providing a design of a physical electronic device comprising an integrated circuit, a physical integrated circuit package, or a physical printed circuit board, the design including a computer readable representation of the physical electronic device;
   accessing, using a computer processor, a portion of the computer readable representation that includes a plurality of components inside a volume, each of the plurality of components representative of a portion of a physical component of the physical electronic device;
   discretizing, using the computer processor, the volume into a plurality of volumetric elements each associated with one of the plurality of components, the elements including a removable signal transmission element;
   removing, using the computer processor, the removable signal transmission element from the discretized volume to obtain a modified discretized volume comprising the discretized volume omitting the removable signal transmission element;
   performing, using the computer processor, a circuit analysis operation to identify an electrical parameter representative of an electrical impact of the removable signal transmission element on the design of the physical electronic device;
   performing, using the computer processor, a finite element method operation to identify a characteristic of the design based on the modified discretized volume and the electrical parameter, wherein the physical electronic device is created or modified in accordance with the characteristic of the design.

2. The method of claim 1, wherein removing the removable signal transmission includes removing multiple removable signal transmission elements, wherein performing, using the computer processor, a circuit analysis operation to identify an electrical parameter representative of an electrical impact of the removable signal transmission element on the design of the physical electronic device includes modeling interactions of the multiple removable signal transmission elements to determine the electrical parameter, the electrical parameter representative of the electrical impact of the multiple removable signal elements.

3. The method of claim 1, wherein the identified characteristic is one or more S-parameters of the design.

4. The method of claim 3, wherein the S-parameters are scattering parameters that describe electrical behavior of the design under stimuli of various electrical signals of different frequencies.

5. The method of claim 1, wherein the electrical parameter is an electric field, a magnetic field, a voltage, a current, or a circuit element selected from a resistor, an inductor, a capacitor, or a controlled source.

6. The method of claim 1, wherein the removable signal transmission element is a transmission line segment.

7. The method of claim 6, further comprising, prior to removing the removable signal transmission element, identifying the removable signal transmission element in the volume by:
   identifying a candidate line segment;
   determining whether there is a reference plane running parallel to the candidate line segment;
   if there is a reference plane, then determining whether the reference plane is sufficiently close to the candidate line segment;
   if there is a reference plane that is sufficiently close, then identifying the candidate line segment as the removable transmission line segment.

8. The method of claim 7, wherein the candidate line segment is identified by assigning a plurality of parallel shapes along and enclosing a metal pathway in the volume, wherein the area within the plurality of parallel shapes is defined as the candidate line segment.

9. The method of claim 8, wherein a portion of the metal pathway remains outside of the plurality of parallel shapes.

10. The method of claim 9, further comprising:
evaluating the portion of the metal pathway that remains outside of the plurality of parallel shapes, wherein, based on the evaluation:
the portion is removed from the volume; or
remains in the volume and is utilized in the finite element method operation.

11. The method of claim 6, further comprising:
identifying portions of the transmission line segment based on a relationship between the transmission line segment and one or more reference planes.

12. The method of claim 11, further comprising:
creating a group of transmission line segments by grouping the transmission line segment with one or more other parallel transmission line segments that completely overlap the transmission line segment in a direction perpendicular to signal propagation within a certain volume sharing one or more same reference planes.

13. The method of claim 12, wherein identifying an electrical parameter representative of an electrical impact of the removable signal transmission element on the design of the physical electronic device includes forming a circuit model by connecting the group of transmission line segments with another group of line segments.

14. The method of claim 1, wherein the removable signal transmission element is a via, a solder ball, a solder bump, a metal shape, a pad, or an antipad.

15. The method of claim 14, wherein identifying an electrical parameter includes determining a voltage or a current associated with the removable signal transmission element.

16. The method of claim 1, further comprising, prior to removing the removable signal transmission element, identifying the removable signal transmission element in the volume by:
identifying a candidate signal transmission element in a portion of the design that is a via, bump, or ball;
determining whether the candidate element is of a particular type of via, bump, or ball;
identifying the candidate element as the removable signal transmission element when the candidate element is not of the particular type.

17. The method of claim 1, further comprising:
identifying a plurality of elements in the form of vias, solder balls, and solder bumps and removing the plurality of elements from the volume; and
generating an electrical circuit model based on the plurality of the removed elements, wherein identifying the electrical parameter includes modeling interactions of the plurality of removed elements to determine the electrical parameter.

18. The method of claim 1, wherein the electrical parameter is a current, and performing a finite element method operation to identify a characteristic of the design based on the modified discretized volume and the electrical parameter includes injecting the current into a finite element method domain as a volumetric line current.

19. The method of claim 1, wherein the creating or modifying the physical electronic device comprises creating or modifying a physical electronic device design.

20. A computer-implemented system for performing a simulation of an integrated circuit, integrated circuit package, or printed circuit board design, comprising:
a processing system comprising one or more data processors;
a non-transitory computer-readable medium encoded with instructions for commanding the processing system to execute steps including:
receiving a design of a physical electronic device comprising an integrated circuit, a physical integrated circuit package, or a physical printed circuit board, the design including a computer readable representation of the physical electronic device;
accessing a portion of the computer readable representation that includes a plurality of components inside a volume, each of the plurality of components representative of a portion of a physical component of the physical electronic device;
discretizing the volume into a plurality of volumetric elements each associated with one of the plurality of components, the elements including a removable signal transmission element;
removing the removable signal transmission element from the portion of the computer readable representation to obtain a modified discretized volume comprising the discretized volume omitting the removable signal transmission element;
performing a circuit analysis operation to identify an electrical parameter representative of an electrical impact of the removable signal transmission element on the design of the physical electronic device;
performing a finite element method operation to identify a characteristic of the design based on the modified discretized volume and the electrical parameter, wherein the physical electronic device is created or modified in accordance with the characteristic of the design.

21. The system of claim 20, wherein the identified characteristic is one or more S-parameters of the design.

22. The system of claim 20, wherein the electrical parameter is an electric field, a magnetic field, a voltage, a current, or a circuit element selected from a resistor, an inductor, a capacitor, or a controlled source.

* * * * *